United States Patent
Isogai et al.

(10) Patent No.: US 7,696,126 B2
(45) Date of Patent: Apr. 13, 2010

(54) METHOD OF PRODUCING OXIDATION CATALYST FOR CLEANING EXHAUST GAS

(75) Inventors: Yuji Isogai, Wako (JP); Kiyoshi Tanaami, Wako (JP); Minako Onodera, Wako (JP); Takahiro Naka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/427,417

(22) Filed: Apr. 21, 2009

(65) Prior Publication Data

US 2009/0202412 A1 Aug. 13, 2009

Related U.S. Application Data

(63) Continuation-in-part of application No. 11/647,449, filed on Dec. 29, 2006, now abandoned.

(30) Foreign Application Priority Data

Feb. 14, 2006 (JP) ............................. 2006-036796

(51) Int. Cl.
*B01J 23/00* (2006.01)
(52) U.S. Cl. ........................ 502/302; 502/303; 502/304
(58) Field of Classification Search ......... 502/302–304; 423/263
See application file for complete search history.

(56) References Cited

U.S. PATENT DOCUMENTS

2004/0089854 A1  5/2004  Chen et al.
2005/0049143 A1  3/2005  Eguchi et al.
2005/0230726 A1  10/2005 Li et al.

FOREIGN PATENT DOCUMENTS

| JP | 59-162948 A | 9/1984 |
| JP | 7-116519 A | 5/1995 |
| JP | 10-3921 A | 1/1998 |
| JP | 2002-346387 A | 12/2002 |
| JP | 2003-334443 A | 11/2003 |

OTHER PUBLICATIONS

Translation of Japan 59-162948, Sep. 13, 1984.*
H.W. Xu et al., Journal of Alloys and Compounds, vol. 221, pp. 274-279, Apr. 15, 1995.
K. Asokan et al., Solid State Communications, vol. 134, pp. 821-826, Jun. 2005.

* cited by examiner

*Primary Examiner*—Steven Bos
(74) *Attorney, Agent, or Firm*—Birch, Stewart, Kolasch & Birch, LLP

(57) ABSTRACT

A method of producing an oxidation catalyst for cleaning exhaust gas, excellent in the function of oxidizing high boiling point materials such as particulates and polycyclic aromatic hydrocarbons contained in the exhaust gas of internal-combustion engines is provided. Metal elements A and B are selected so that the value of the ionic radius of metal element A/the ionic radius of metal element B is in the range of from 1.349 to 1.580. After reacting the grind mixed material of the first metal element A, the second metal element B, and urea, the reactant material is grind mixed, and thereafter subjected to firing at 600 to 1200° C. for 1 to 5 hours. By doing so, an oxidation catalyst for cleaning exhaust gas comprising a composite oxide represented by the general formula $ABO_3$ is obtained.

3 Claims, 4 Drawing Sheets

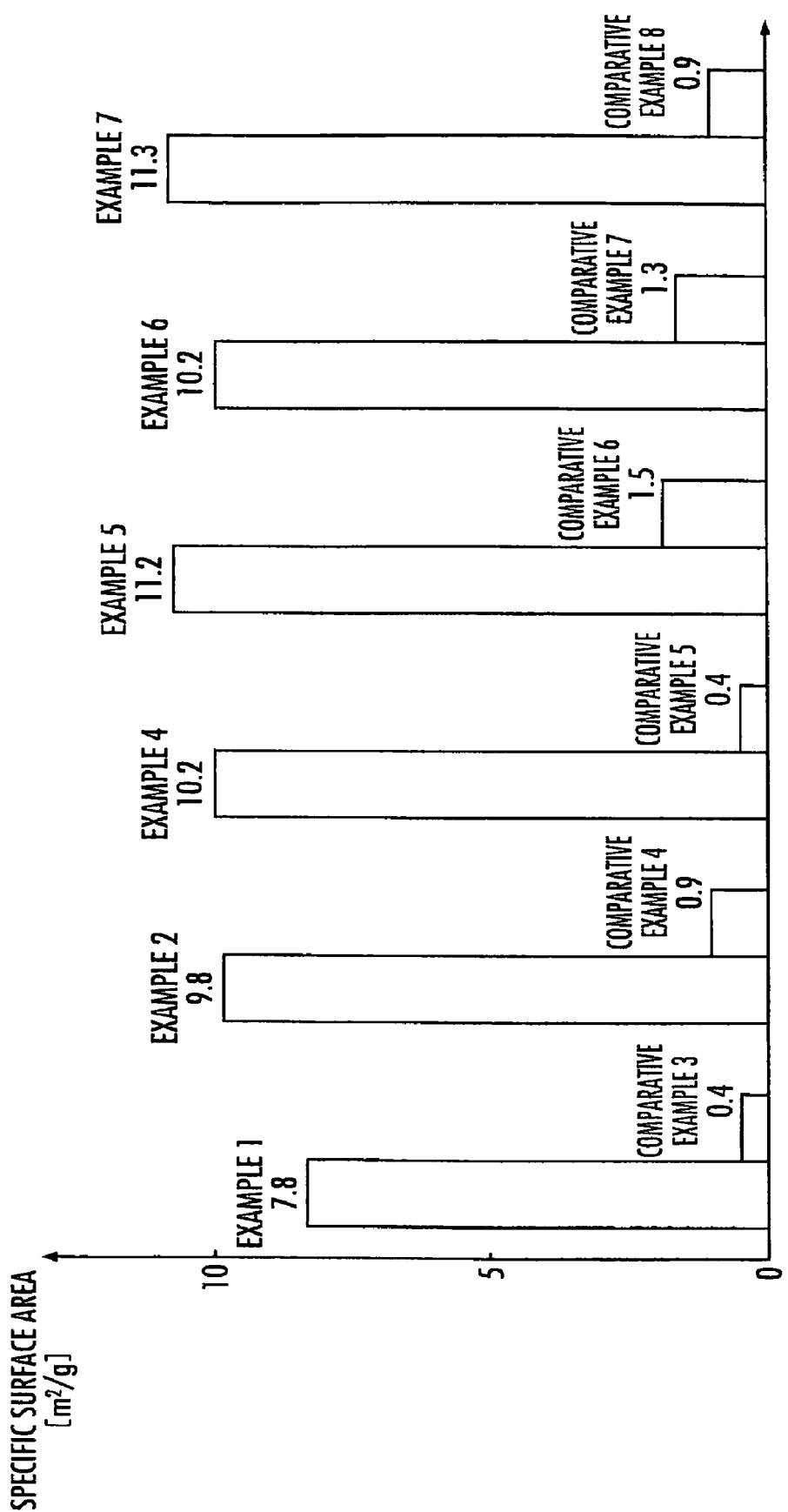

METHOD OF PRODUCING OXIDATION CATALYST FOR CLEANING EXHAUST GAS

BACKGROUND OF THE INVENTION

1. Field of the Invention

The present invention relates to a method of producing an oxidation catalyst for cleaning exhaust gas, which oxidizes particulates, polycyclic aromatic hydrocarbons and the like contained in the exhaust gas discharged from internal-combustion engines to clean the exhaust gas.

2. Description of the Related Art

In order to clean the exhaust gas discharged from internal-combustion engines such as a motorcar engine, an oxidation catalyst for cleaning exhaust gas in which a noble metal as a catalyst is supported on a heat-resistant carrier such as alumina, and ceria or the like is further mixed to promote oxidation reaction has been conventionally used. The conventional oxidation catalyst for cleaning exhaust gas can oxidize volatile organic compounds (VOCs) having low boiling points contained in the above exhaust gas, but cannot achieve sufficient function for oxidizing the particulates and polycyclic aromatic hydrocarbons.

This is due to that the particulates and polycyclic aromatic hydrocarbons have high boiling points and are chemically more stable than the VOCs. In order to oxidize particulates, polycyclic aromatic hydrocarbons, and the like contained in the exhaust gas, it is therefore conceivable to use a composite oxide containing two kinds of metal elements as an oxidation catalyst capable of giving an atmosphere of stronger oxidation reaction.

As the composite oxide, there is known, for example, a compound having a perovskite structure, represented by the chemical formula of $AB_{1-x}C_xO_3$ wherein A is at least one of lanthanum, strontium, cerium, barium, and calcium; B is at least one of cobalt, iron, nickel, chromium, manganese, and magnesium; and C is at least one of platinum and palladium (see, for example, Japanese Patent Laid-Open No. 2003-334443). The compound having a perovskite structure is considered capable of decreasing the combustion starting temperature of particulates because the platinum or palladium is activated.

As the composite oxide, there is also known, for example, a cerium-zirconium composite oxide (see Japanese Patent Laid-Open No. 7-116519). The cerium-zirconium composite oxide has an oxygen storage capacity, and is considered to release the oxygen when the cerium atom produces a valence change from tetravalency to trivalency in a reducing atmosphere.

However, the conventional composite oxides are not sufficient in the function of oxidizing particulates, polycyclic aromatic hydrocarbons, and the like contained in the above-described exhaust gas, and desired to be further improved.

SUMMARY OF THE INVENTION

In view of such circumstances, an object of the present invention is to provide a method of producing an oxidation catalyst for cleaning exhaust gas, excellent in the function of oxidizing high boiling point materials such as particulates and polycyclic aromatic hydrocarbons contained in the exhaust gas of internal-combustion engines.

In order to achieve the above object, the present invention provides a method of producing an oxidation catalyst for cleaning exhaust gas comprising a composite oxide containing a first metal element A and a second metal element B and represented by the general formula of $ABO_3$, comprising the steps of: selecting the first metal element A and the second metal element B such that the value of (the ionic radius of the first metal element A)/(the ionic radius of the second metal element B) is in the range of from 1.349 to 1.580, grind mixing acetate, nitrate or oxide of the first metal element A, acetate or nitrate of the second metal element B, and urea, reacting the grind mixed material, and grind mixing the reactant material and subsequently firing the same at 600 to 1200° C. for 1 to 5 hours.

Preferably, the first metal element A is selected from the group consisting of Sc, Y, Ho, Er, Tm, Yb, and Lu, and the second metal element B is Mn.

Preferably, the resultant material is grind mixed and thereafter subjected to firing at 800° C. for 1 hour.

The value of ionic radius adopts Shannon's ionic radius; it is the value of an octa-coordinated trivalent ionic radius for the metal element A or the value of a hexa-coordinated trivalent ionic radius for the metal element B.

The oxidation catalyst for cleaning exhaust gas produced according to the method of the invention can have a value of the ionic radius ratio between the two kinds of metal elements A and B (the ionic radius of metal element A)/(the ionic radius of metal element B) falling within the above-described range to make the composite oxide into a hexagonal structure to give an oxygen storage capacity more excellent than that of a composite oxide having a perovskite structure or a cerium-zirconium composite oxide. Thus, the oxidation catalyst for cleaning exhaust produced according to the method of the invention can generate an extremely strong oxidation atmosphere in oxidizing high boiling point materials such as particulates and polycyclic aromatic hydrocarbons contained in the exhaust gas of internal-combustion engines, and enables the oxidation to be conducted at a temperature lower than before.

A value of the ionic radius ratio of more than 1.580 makes the structure of the composite oxide into a perovskite structure, and cannot give a sufficient oxygen storage capacity. A value of the ionic radius ratio of less than 1.349 does not enable the composite oxide to have a hexagonal structure, and cannot again give a sufficient oxygen storage capacity.

BRIEF DESCRIPTION OF THE DRAWINGS

FIG. 4 is a graph showing the relationship between the producing condition of the composite oxide and the specific surface area of the composite oxide.

DETAILED DESCRIPTION OF THE PREFERRED EMBODIMENTS

Figure 1:
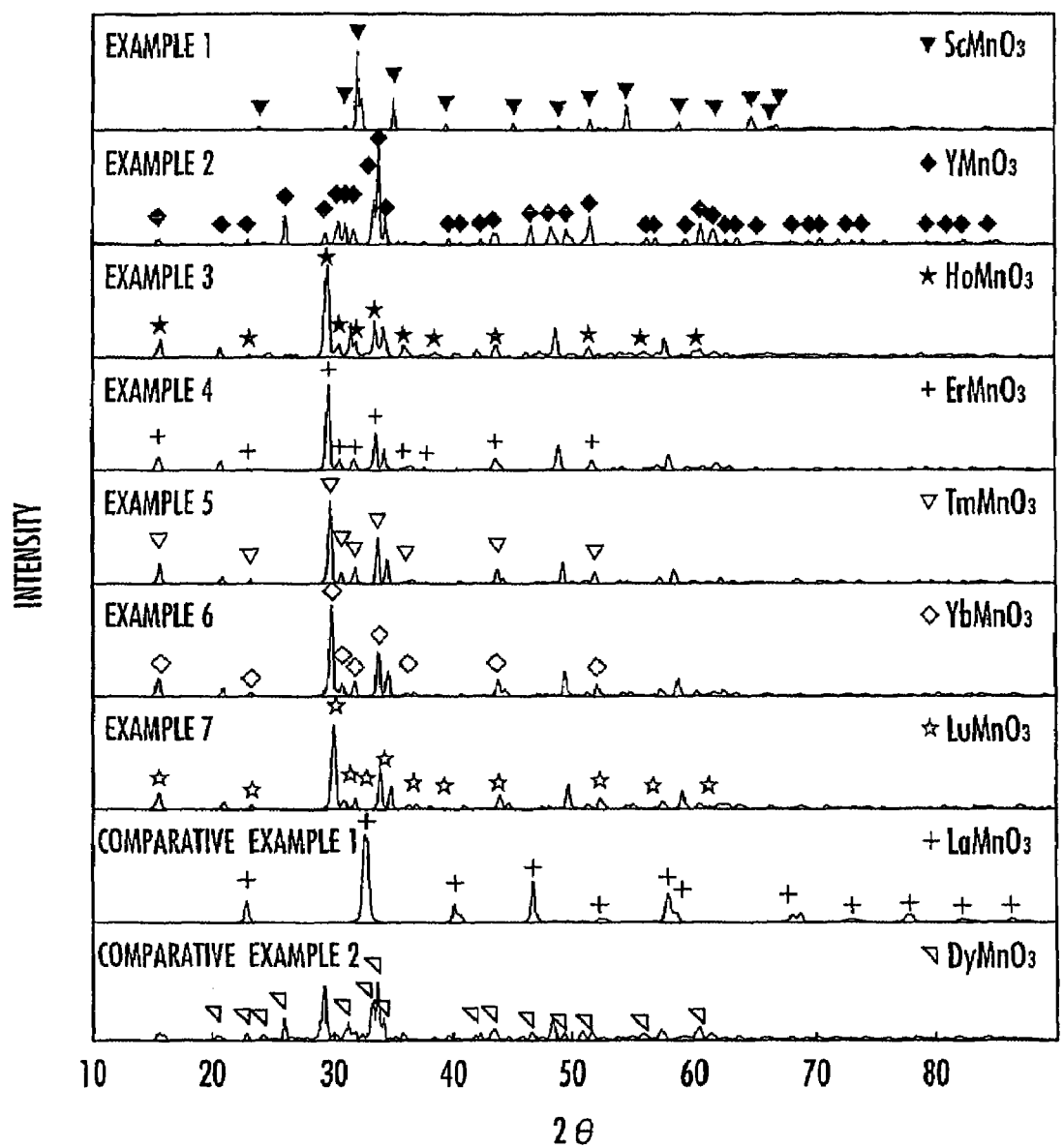
FIG. 1 is a set of X-ray diffraction patterns showing the structures of composite oxides forming oxidation catalysts for cleaning exhaust gas according to the present invention.

An embodiment of the present invention will be now described in further detail with reference to the accompanying drawings.

The oxidation catalyst for cleaning exhaust gas according to the present embodiment is a composite oxide which contains two kinds of metal elements A and B and is represented by the general formula of $ABO_3$, wherein the value of the ionic radius ratio between the two kinds of metal elements A and B (the ionic radius of metal element A)/(the ionic radius of metal element B) is in the range of from 1.349 to 1.580. Combinations of the metal elements A and B each allowing the ionic radius ratio to fall within the above-described range include, for example, a case where the metal element A is one kind of metal element selected from the group consisting of Sc, Y, Ho, Er, Tm, Yb, and Lu, and the metal element B is Mn.

The composite oxide has a hexagonal structure, which is a unique structure where the metal element B having a small ionic radius is surrounded by a total of 5 oxygen atoms: 3 oxygen atoms lying in the same plane as the atom of the metal element B and 2 apical oxygen atoms.

The composite oxide can be produced, for example, as follows.

First, an acetate, nitrate, or oxide of the metal element A, an acetate or nitrate of the metal element B, and urea are grind mixed in a molar ratio of 1:1:1 to 20, for example, in a molar ratio of 1:1:6. The grind mixing may be carried out, if necessary, using a ball mill or the like.

Next, the resultant mixture is allowed to react at a temperature of 100 to 250° C. for 30 to 300 minutes, then at 270 to 330° C. for 30 to 300 minutes, and further at 350 to 500° C. for 30 to 300 minutes. The reaction may be conducted, for example, by subjecting to treatment at 250° C. for 30 minutes, then at 300° C. for 30 minutes, and further at 350° C. for one hour.

Then, the resultant reaction mixture can be grind mixed, followed by calcining at a temperature of 600 to 1,200° C. for 1 to 5 hours to provide a desired composite oxide. The grind mixing may be carried out, if necessary, using a ball mill or the like. The calcining may be carried out, for example, by treatment at a temperature of 800° C. for one hour.

The composite oxide may be used alone per se as an oxidation catalyst for cleaning exhaust gas, or may be also used by adding it to a different oxidation catalyst as a co-catalyst for promoting the oxidation property of the different oxidation catalyst. Methods for supplying to the reaction system the composite oxide alone as an oxidation catalyst for cleaning exhaust gas include, for example, a method involving applying the composite oxide to a heat-resistant ceramic structure such as cordierite used as a conventional catalyst carrier, a method involving mixing the heat-resistant ceramic structure and the composite oxide, and a method involving forming the composite oxide per se into pellet.

The composite oxide may be also used in the form of a three-way component catalyst in combination with a group VIII element. In this instance, when producing the composite oxide as described above, for example, a group VIII element can be preliminarily added as a raw material to dope the group VIII element as a constituent element of the composite oxide in a crystal. Alternatively, a group VIII element may be also supported on the surface of the preliminarily produced composite oxide.

EXAMPLES AND COMPARATIVE EXAMPLES OF THE PRESENT INVENTION WILL BE NOW PRESENTED

Example 1

In this Example, the acetate or nitrate of manganese was first added to the acetate or nitrate of scandium into a molar ratio of Sc:Mn=1:1, to which urea was further added into a molar ratio of Sc:Mn:$N_2H_4CO$=1:1:6, followed by grind mixing. Next, the resultant mixture was allowed to react in the air at 250° C. for 30 minutes, then at 300° C. for 30 minutes, and further at 350° C. for one hour. After the end of reaction, the resultant mixture was subsequently grind mixed, followed by calcining in the air at 800° C. for one hour to provide a composite oxide.

To ascertain the crystal structure of the composite oxide obtained in this Example, the X-ray diffraction pattern thereof was then measured. The measurement was carried out under conditions of tube voltage: 50 kV, tube current: 150 mA, diffractometer: 4°/minute, and measuring range (2θ): 10 to 90° using an X-ray diffractometer from Burker. As a result, it turned out that the crystal obtained in this Example was $ScMnO_3$ having a hexagonal structure. The ionic radius ratio between Sc and Mn (the ionic radius of Sc/the ionic radius of Mn) was 1.349. The X-ray diffraction pattern is shown in FIG. 1.

Figure 2:
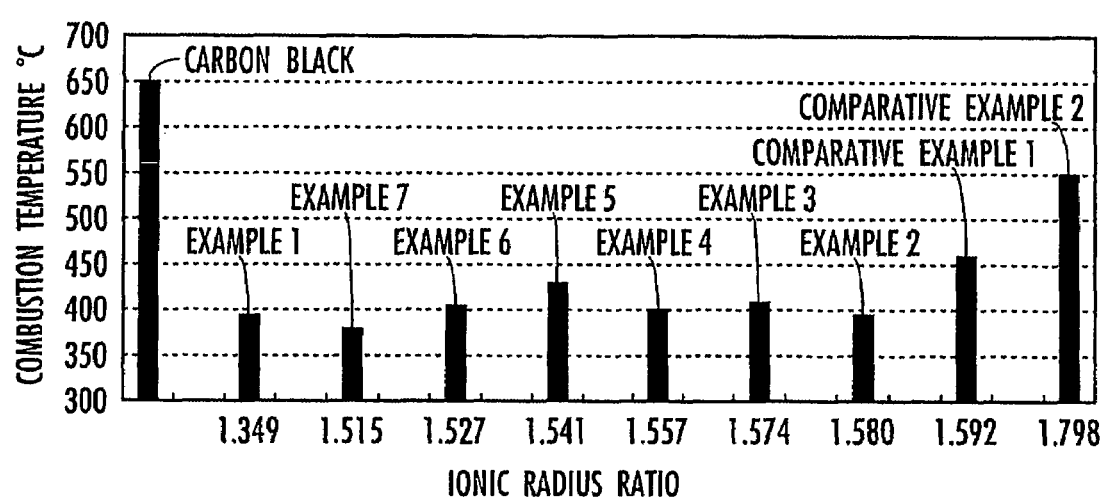
FIG. 2 is a bar graph showing the relationship between the value of the ionic radius ratio of each composite oxide and the combustion peak temperature of carbon black in each oxidation catalyst for cleaning exhaust gas according to the present invention.

To evaluate the oxidation property of the composite oxide obtained in this Example for particulates, the composite oxide was then mixed with carbon black, followed by performing the thermal analysis of carbon black. The thermal analysis was carried out by using as a sample the mixture obtained by weighing the composite oxide acquired in this Example and carbon black so as to provide a weight ratio of composite oxide:carbon black=20:1, which were then mixed employing an agate mortar for 5 minutes, and then the sample was heated up in the air from room temperature to 800° C. at a speed of 10° C./minute under an atmosphere of an air stream of 15 ml/minute on a thermal analysis instrument from Rigaku Corporation. The mixture of the composite oxide obtained in this Example and carbon black had a combustion peak temperature of 410° C. The result is shown in FIG. 2.

In addition, thermal analysis was separately carried out just as described above except for the use of only carbon black as a sample. As a result, the combustion peak temperature of carbon black alone was 650° C. The result is shown in FIG. 2.

Example 2

In this Example, a composite oxide was first obtained just as described in Example 1 except for the use of the acetate or nitrate of yttrium instead of the acetate or nitrate of scandium.

To ascertain the crystal structure of the composite oxide obtained in this Example, the X-ray diffraction pattern thereof was then measured just as described in Example 1. As a result, it turned out that the crystal obtained in this Example was $YMnO_3$ having a hexagonal structure. The ionic radius ratio between Y and Mn (the ionic radius of Y/the ionic radius of Mn) was 1.580. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 390° C. The result is shown in FIG. 2.

Example 2-2

In this Example, a composite oxide was first obtained under the same condition as in Example 2 except that the grind mixed resultant material was fired not at 800° C. for 1 hour but at 600° C. for 5 hours.

Example 2-3

In this Example, a composite oxide was first obtained under the same condition as in Example 2 except that the grind mixed resultant material was fired not at 800° C. for 1 hour but at 1200° C. for 1 hour.

Example 3

In this Example, a composite oxide was first obtained just as described in Example 1 except for the use of the acetate or nitrate of holmium instead of the acetate or nitrate of scandium.

To ascertain the crystal structure of the composite oxide obtained in this Example, the X-ray diffraction pattern thereof was then measured just as described in Example 1. As a result, it turned out that the crystal obtained in this Example was $HoMnO_3$ having a hexagonal structure. The ionic radius ratio between Ho and Mn (the ionic radius of Ho/the ionic radius of Mn) was 1.574. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 430° C. The result is shown in FIG. 2.

Example 4

In this Example, the acetate or nitrate of manganese was first added to the oxide of erbium into a molar ratio of Er:Mn=1:1, to which urea was further added into a molar ratio of $Er:Mn:N_2H_4CO$=1:1:6, followed by grind mixing using a ball mill for 5 hours. Next, the resultant mixture was allowed to react in the air at 250° C. for 30 minutes, then at 300° C. for 30 minutes, and further at 350° C. for one hour. After the end of reaction, the resultant mixture was subsequently grind mixed using a ball mill for 3 hours, followed by calcining in the air at 800° C. for one hour to provide a composite oxide.

To ascertain the crystal structure of the composite oxide obtained in this Example, the X-ray diffraction pattern thereof was then measured just as described in Example 1. As a result, it turned out that the crystal obtained in this Example was $ErMnO_3$ having a hexagonal structure. The ionic radius ratio between Er and Mn (the ionic radius of Er/the ionic radius of Mn) was 1.557. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 400° C. The result is shown in FIG. 2.

Example 5

In this Example, a composite oxide was first obtained just as described in Example 4 except for the use of the oxide of thulium instead of the oxide of erbium.

To ascertain the crystal structure of the composite oxide obtained in this Example, the X-ray diffraction pattern thereof was then measured just as described in Example 1. As a result, it turned out that the crystal obtained in this Example was $TmMnO_3$ having a hexagonal structure. The ionic radius ratio between Tm and Mn (the ionic radius of Tm/the ionic radius of Mn) was 1.541. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 430° C. The result is shown in FIG. 2.

Example 6

In this Example, a composite oxide was first obtained just as described in Example 4 except for the use of the oxide of ytterbium instead of the oxide of erbium.

To ascertain the crystal structure of the composite oxide obtained in this Example, the X-ray diffraction pattern thereof was then measured just as described in Example 1. As a result, it turned out that the crystal obtained in this Example was $YbMnO_3$ having a hexagonal structure. The ionic radius ratio between Yb and Mn (the ionic radius of Yb/the ionic radius of Mn) was 1.527. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 405° C. The result is shown in FIG. 2.

Example 7

In this Example, a composite oxide was first obtained just as described in Example 4 except for the use of the oxide of lutetium instead of the oxide of erbium.

To ascertain the crystal structure of the composite oxide obtained in this Example, the X-ray diffraction pattern thereof was then measured just as described in Example 1. As a result, it turned out that the crystal obtained in this Example was $LuMnO_3$ having a hexagonal structure. The ionic radius ratio between Lu and Mn (the ionic radius of Lu/the ionic radius of Mn) was 1.516. The X-ray diffraction pattern is shown in FIG. 1.

To evaluate the oxidation property of the composite oxide obtained in this Example for particulates, the composite oxide was then mixed with carbon black, followed by performing the thermal analysis of carbon black just as described in Example 1. The mixture of the composite oxide obtained in this Example and carbon black had a combustion peak temperature of 380° C. The result is shown in FIG. 2.

Comparative Example 1

In this Comparative Example, a composite oxide was first obtained just as described in Example 1 except for the use of the acetate or nitrate of lanthanum instead of the acetate or nitrate of scandium.

To ascertain the crystal structure of the composite oxide obtained in this Comparative Example, the X-ray diffraction pattern thereof was then measured just as described in Example 1. As a result, it turned out that the crystal obtained in this Comparative Example was $LaMnO_3$ having an orthorhombic structure. The ionic radius ratio between La and Mn (the ionic radius of La/the ionic radius of Mn) was 1.592. The X-ray diffraction pattern is shown in FIG. 1.

To evaluate the oxidation property of the composite oxide obtained in this Comparative Example for particulates, the composite oxide was then mixed with carbon black, followed by performing the thermal analysis of carbon black just as described in Example 1. The mixture of the composite oxide obtained in this Comparative Example and carbon black had a combustion peak temperature of 450° C. The result is shown in FIG. 2.

Comparative Example 2

In this Comparative Example, a composite oxide was first obtained just as described in Example 4 except for the use of the oxide of dysprosium instead of the oxide of erbium.

To ascertain the crystal structure of the composite oxide obtained in this Comparative Example, the X-ray diffraction pattern thereof was then measured just as described in Example 1. As a result, it turned out that the crystal obtained in this Comparative Example was $DyMnO_3$ having an orthorhombic structure. The ionic radius ratio between Dy and Mn (the ionic radius of Dy/the ionic radius of Mn) was 1.798. The X-ray diffraction pattern is shown in FIG. 1.

To evaluate the oxidation property of the composite oxide obtained in this Comparative Example for particulates, the composite oxide was then mixed with carbon black, followed by performing the thermal analysis of carbon black just as described in Example 1. The mixture of the composite oxide obtained in this Comparative Example and carbon black had a combustion peak temperature of 550° C. The result is shown in FIG. 2.

It is apparent from FIG. 2 that the composite oxides of Examples 1 to 7 each containing two kinds of metal elements, A and B, wherein, when the metal element A is one kind of metal element selected from the group consisting of Sc, Y, Ho, Er, Tm, Yb, and Lu, and the metal element B is Mn, the value of the ionic radius ratio (the ionic radius of metal element A)/(the ionic radius of metal element B) is in the range of from 1.349 to 1.580, can decrease the combustion peak temperature of carbon black compared to the composite compound of Comparative Example 1 ($LaMnO_3$) and the composite compound of Comparative Example 2 ($DyMnO_3$) each having an ionic radius exceeding the above range, and have an excellent oxidation property.

Comparative Examples 3 to 8

In Comparative Examples 3 to 8, composite oxides were first prepared under the same conditions as in Example 1, (Example 2, Example 2-2, Example 2-3) and Examples 4 to 7, respectively, except that the grind mixed resultant materials were not fired at 800° C. for 1 hour but at 1300° C. for 10 hours.

Figure 3:
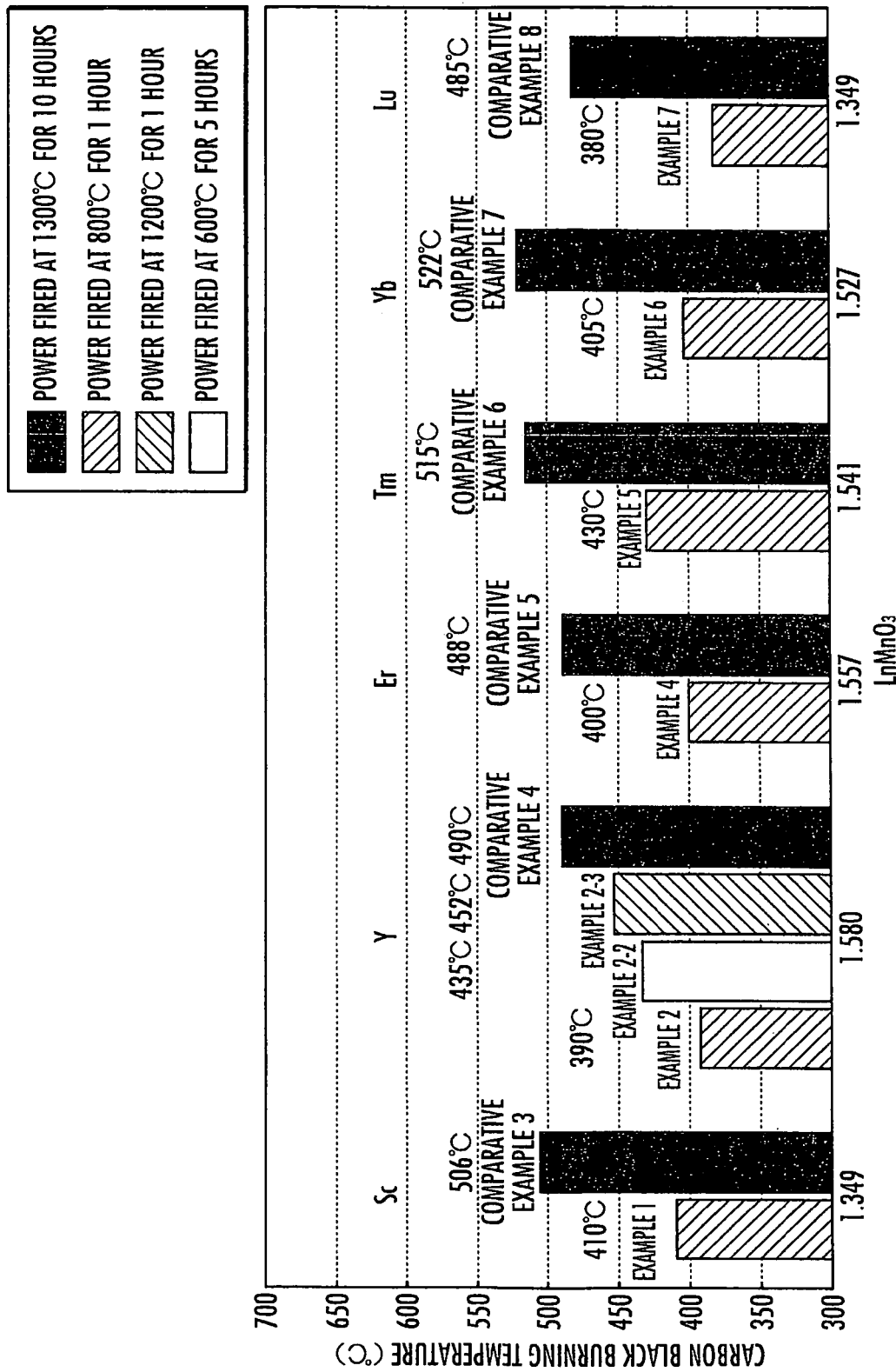
FIG. 3 is a graph showing the relationship between the producing condition of the composite oxide and the burning temperature of the carbon black.

As is apparent from FIG. 3, the burning temperatures of the carbon black of the composite oxides of Example 1, (Example 2, Example 2-2, Example 2-3) and Examples 4 to 7, respectively, are lower by 40 to 100° C. than in the case of the composite oxides according to Comparative Examples 3 to 8. Thus, by controlling the firing condition of the grind mixed resultant material according to the present invention, it is possible to provide excellent oxidation characteristic to the composite oxide.

Further, as is apparent from FIG. 4, the composite oxides according to Examples 1, 2, and 4 to 7, respectively, have larger specific surface area than the composite oxides according to Comparative Examples 3 to 8, respectively. Thus, it is clear that by controlling the firing condition of the grind mixed resultant material according to the present invention, it is possible to provide excellent oxygen storage capacity to the composite oxide. Here, the specific surface area may be measured according to known technique such as a BET method and the like.

Thus, the composite oxides of Examples 1 to 7 can form oxidation catalysts for cleaning exhaust gas, excellent in the function of oxidizing high boiling point materials such as particulates and polycyclic aromatic hydrocarbons.

What is claimed is:

1. A method of producing an oxidation catalyst for cleaning exhaust gas comprising a composite oxide containing a first metal element A and a second metal element B and represented by the general formula of $ABO_3$, comprising the steps of:
    selecting the first metal element A and the second metal element B such that the ratio of the ionic radius of the first metal element A to the ionic radius of the second metal element B is in the range of from 1.349 to 1.580,
    grind mixing acetate, nitrate or oxide of the first metal element A, acetate or nitrate of the second metal element B, and urea to form a grind mixed material,
    reacting the grind mixed material to form reactant material, and
    grind mixing the reactant material and subsequently firing the reactant material at 600 to 1200° C. for 1 to 5 hours.

2. The method according to claim 1, wherein said first metal element A is selected from the group consisting of Sc, Y, Ho, Er, Tm, Yb, and Lu, and said second metal element B is Mn.

3. The method according to claim 2, wherein the reactant material is fired at 800° C. for 1 hour.

* * * * *